(12) United States Patent
Horst et al.

(10) Patent No.: US 9,122,028 B2
(45) Date of Patent: *Sep. 1, 2015

(54) HIGH-PRECISION PASSIVE ALIGNMENT OF OPTICAL COMPONENTS WITH OPTICAL WAVEGUIDES USING A COMMON ADAPTER

(71) Applicant: International Business Machines Corporation, Armonk, NY (US)

(72) Inventors: Folkert Horst, Rueschlikon (CH); Antonio La Porta, Rueschlikon (CH); Bert J. Offrein, Rueschlikon (CH); Ibrahim Murat Soganci, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,044

(22) Filed: Oct. 1, 2013

(65) Prior Publication Data

US 2014/0093208 A1    Apr. 3, 2014

Related U.S. Application Data

(63) Continuation of application No. 14/017,519, filed on Sep. 4, 2013.

(30) Foreign Application Priority Data

Sep. 28, 2012   (GB) .................................. 1217385.2

(51) Int. Cl.
G02B 6/36     (2006.01)
G02B 6/42     (2006.01)

(52) U.S. Cl.
CPC .............. *G02B 6/4234* (2013.01); *G02B 6/423* (2013.01); *G02B 6/425* (2013.01)

(58) Field of Classification Search
USPC ........................................................... 385/52
See application file for complete search history.

(56) References Cited

U.S. PATENT DOCUMENTS

5,071,213 A    12/1991  Chan
5,179,609 A    1/1993   Blonder et al.
(Continued)

FOREIGN PATENT DOCUMENTS

CN    1209203 A    2/1999
CN    101180562 A  5/2008
(Continued)

OTHER PUBLICATIONS

GB Intellectual Property Office; Application No. GB1217385.2; Date Mailed: Jan. 29, 2013; Patents Act 1977: Search Report Under Section 17(5); pp. 1-3.

(Continued)

*Primary Examiner* — Eric Wong
(74) *Attorney, Agent, or Firm* — Cantor Colburn LLP

(57) ABSTRACT

A method for aligning optical components comprised in an optical component assembly and optical waveguides comprised in an optical waveguide assembly according to a common optical axis and by using an adapter includes providing the optical component assembly with a first alignment structure comprising a cavity designed according to the position of the optical components within the optical component assembly; providing an adapter presenting a base surface comprising a first step structure; providing the optical waveguide assembly with a second alignment structure comprising a distinct step structure designed according to the position of the waveguides within the waveguides assembly; and positioning the optical component assembly, the optical waveguide assembly and the adapter, so that a sidewall of the cavity and the distinct step structure are put in contact with a sidewall of the first step structure.

7 Claims, 4 Drawing Sheets

(56) References Cited

U.S. PATENT DOCUMENTS

| | | | |
|---|---|---|---|
| 5,854,867 A | 12/1998 | Lee et al. | |
| 5,879,571 A | 3/1999 | Kalman et al. | |
| 5,959,315 A | 9/1999 | Lebby et al. | |
| 6,095,697 A * | 8/2000 | Lehman et al. | 385/88 |
| 6,115,521 A | 9/2000 | Tran et al. | |
| 6,272,272 B1 | 8/2001 | Ford | |
| 6,584,250 B2 | 6/2003 | Lin et al. | |
| 6,654,524 B2 | 11/2003 | Shekel et al. | |
| 6,865,321 B2 | 3/2005 | Tella et al. | |
| 6,904,190 B2 | 6/2005 | Korenaga et al. | |
| 7,027,677 B2 | 4/2006 | Li et al. | |
| 7,099,534 B2 | 8/2006 | Kato et al. | |
| 7,184,646 B2 | 2/2007 | Velsher | |
| 7,236,666 B2 | 6/2007 | George et al. | |
| 7,267,930 B2 | 9/2007 | Payne | |
| 7,275,877 B2 | 10/2007 | Go | |
| 7,298,941 B2 | 11/2007 | Palen et al. | |
| 7,366,375 B2 | 4/2008 | Ohtorii | |
| 7,369,724 B2 | 5/2008 | Deane | |
| 7,373,033 B2 | 5/2008 | Lu et al. | |
| 7,415,184 B2 | 8/2008 | Ghiron et al. | |
| 7,428,351 B2 | 9/2008 | Jenkins et al. | |
| 7,477,816 B2 | 1/2009 | Juni | |
| 7,547,148 B2 * | 6/2009 | Ikunishi | 385/78 |
| 7,676,131 B2 | 3/2010 | Luo | |
| 7,853,105 B2 | 12/2010 | Budd et al. | |
| 8,554,026 B2 * | 10/2013 | Chang et al. | 385/14 |
| 2002/0028046 A1 * | 3/2002 | Delprat | 385/52 |
| 2003/0012508 A1 | 1/2003 | Westmarland et al. | |
| 2003/0031409 A1 * | 2/2003 | Bellman et al. | 385/33 |
| 2006/0239605 A1 | 10/2006 | Palen et al. | |
| 2008/0008419 A1 * | 1/2008 | Krahenbuhl et al. | 385/33 |
| 2008/0144999 A1 * | 6/2008 | Takeda et al. | 385/51 |
| 2009/0162004 A1 | 6/2009 | Johnson et al. | |
| 2010/0220318 A1 | 9/2010 | Moll et al. | |
| 2011/0013866 A1 | 1/2011 | Rosenberg et al. | |
| 2011/0013869 A1 | 1/2011 | Pezeshki et al. | |
| 2011/0164848 A1 | 7/2011 | Bolle | |
| 2014/0050442 A1 * | 2/2014 | Wurster et al. | 385/50 |

FOREIGN PATENT DOCUMENTS

| | | |
|---|---|---|
| GB | 2439751 A | 1/2008 |
| JP | 2006235262 A | 9/2006 |

OTHER PUBLICATIONS

GB Intellectual Property Office; Application No. GB1217383.7; Patents Act 1977: Search Report Under Section 17(5); Date Mailed: Jan. 29, 2013; pp. 1-5.

* cited by examiner

HIGH-PRECISION PASSIVE ALIGNMENT OF OPTICAL COMPONENTS WITH OPTICAL WAVEGUIDES USING A COMMON ADAPTER

PRIORITY

This application is a continuation of U.S. patent application Ser. No. 14/017,519, filed Sep. 4, 2013, which claims priority to Great Britain Patent Application No. 1217385.2, filed Sep. 28, 2012, and all the benefits accruing therefrom under 35 U.S.C. §119, the contents of which in its entirety are herein incorporated by reference.

BACKGROUND

The present invention relates to the field of aligning optical components, notably optical coupling elements, to optical waveguides.

Alignment errors lead to loss of optical signal and should there be avoided, or at least limited.

U.S. Pat. No. 6,115,521 describes an alignment device for the coupling of light between optical devices. It comprises a cavity etched inside the substrate in order to position an optical component.

Such an arrangement implies high sensitivity to the thickness of the etched cavity and the component fabrication process is made costly and complex due to this context.

SUMMARY

In one embodiment, a method for aligning optical components comprised in an optical component assembly and optical waveguides comprised in an optical waveguide assembly according to a common optical axis and by using an adapter. The method includes providing the optical component assembly with a first alignment structure comprising a cavity designed according to the position of the optical components within the optical component assembly; providing an adapter presenting a base surface comprising a first step structure; providing the optical waveguide assembly with a second alignment structure comprising a distinct step structure designed according to the position of the waveguides within the waveguides assembly; and positioning the optical component assembly, the optical waveguide assembly and the adapter, so that a sidewall of the cavity and the distinct step structure are put in contact with a sidewall of the first step structure.

In another embodiment, an apparatus for aligning optical components with optical waveguides according to a common optical axis includes an optical component assembly comprising the optical components and a first alignment structure associated with the substrate of the optical component assembly, the first alignment structure including a cavity designed according to the position of the optical components within the optical component assembly; an adapter presenting a base surface comprising a first step structure; and an optical waveguides assembly including the optical waveguides and a second alignment structure including a distinct step structure designed according to the position of the waveguides within the waveguides assembly; wherein the optical component assembly, the optical waveguide assembly and the adapter are positioned so that a sidewall of the cavity and the distinct step structure are in contact with a sidewall of the first step structure.

BRIEF DESCRIPTION OF THE SEVERAL VIEWS OF THE DRAWINGS

The above and other aspects of the features of the present invention will become readily apparent from the detailed description that follows, with reference to accompanying drawings, in which.

DETAILED DESCRIPTION

Figure 1:
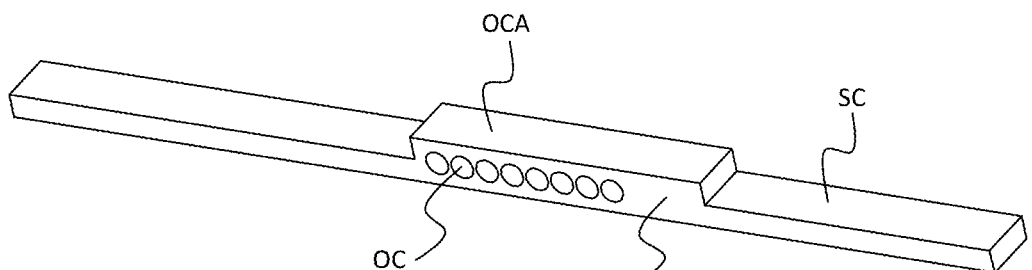
FIG. 1 depicts an optical component assembly according to an embodiment of the invention.

According to a first aspect thereof, the invention can be embodied as a method for aligning optical components comprised in an optical component assembly and optical waveguides comprised in an optical waveguide assembly according to a common optical axis and by using an adapter, the method including providing the optical component assembly with a first alignment structure comprising a cavity designed according to the position of the optical components within the optical component assembly; providing an adapter presenting a base surface comprising a first step structure; providing the optical waveguide assembly with a second alignment structure comprising a distinct step structure designed according to the position of the waveguides within the waveguides assembly; positioning the optical component assembly, the optical waveguide assembly and the adapter, so that a sidewall of the cavity and the distinct step structure are put in contact with a sidewall of the first step structure.

In embodiments, the method may comprise one or more of the following features: the adapter further comprises a second step structure having a front wall and a back wall perpendicular to the optical axis, and, the front face of the optical waveguide assembly is put in contact with the back wall of the second step structure; the front face of the optical component assembly is aligned with the front wall of the second step structure; the second alignment structure further comprises an accessible surface of the lower cladding layer and wherein the surface of the first step structure is put in contact with the accessible surface; a bottom surface of the cavity is put in contact with the surface of the first step structure; the part of the distinct step structure put in contact with the sidewall of the first step structure is positioned at a distance of a first reference point associated with the waveguides equal to the distance between a second reference point associated with the optical components and the sidewall of the cavity; and the first step structure is made of two parallel substructures, each of them having two sidewalls on both sides.

According to another aspect, the invention can be embodied as an arrangement designed for aligning optical components with optical waveguides according to a common optical axis, the arrangement including an optical component assembly comprising the optical components and a first alignment structure associated with the substrate of the optical component assembly, the first alignment structure comprising a cavity designed according to the position of the optical components within the optical component assembly; an adapter presenting a base surface comprising a first step structure; an optical waveguides assembly comprising the optical waveguides and a second alignment structure comprising a distinct step structure designed according to the position of the waveguides within the waveguides assembly; wherein the optical component assembly, the optical waveguide assembly and the adapter are positioned so that a sidewall of the cavity and the distinct step structure can be put in contact with a sidewall of the first step structure.

In embodiments, the arrangement may comprise one or more of the following features: the optical components comprise optical lenses; the optical components comprise mirrors; the part of the distinct step structure in contact with the sidewall of the first step structure is positioned at a distance of a first reference point associated with the waveguides equal to the distance between a second reference point associated with the optical components and the sidewall of the cavity; the waveguides assembly comprises a top cladding layer covering the waveguides; the top cladding layer covers partially the distinct step structure; and the first step structure is made of two parallel substructures, each of them having two sidewalls on both sides.

According to a final aspect, the invention can be embodied as a method of fabrication of an arrangement as described above.

As an introduction to the following description, it is first pointed out at a general aspect of the invention, according to which the invention is embodied as a method for aligning optical components of an optical component assembly and optical waveguides of an optical waveguide assembly, according to a common optical axis and by using an adapter. The optical component assembly is provided with a first alignment structure comprising a cavity designed according to the position of the optical components within the optical component assembly. An adapter is provided too, which has a base surface comprising a first step structure. As discussed in detail below, the adapter further comprises a second step structure. Next, the optical waveguide assembly is provided with a second alignment structure comprising a distinct step structure (i.e., distinct from the first and the second step structure, if any, and which is mostly referred to as a "third step structure" below), designed according to the position of the waveguides within the waveguides assembly. Finally, the optical component assembly, the optical waveguide assembly and the adapter are positioned so that a sidewall of the cavity and the distinct (or third) step structure are put in contact with a sidewall of the first step structure.

FIG. 1 illustrates an optical component assembly OCA which comprises at least one optical component OC and a substrate on which the optical component(s) OC are fabricated. The optical components can be any of lenses, mirrors, etc. They usually form an array of individual optical components, although the situation of a single optical component can also be considered.

They can be, for instance, optical components enabling the coupling at the input and/or output of optical waveguides. It can, for instance, be an array of lenses in the case of in-plane coupling. Out-of-plane coupling can be implemented using an array of lenses and an array of deflecting mirrors in a row. As it will be clearly apparent from the following description, the invention makes it possible to mount multiple optical component assemblies OCA in front of a same waveguide assembly.

In the example of FIG. 1, the optical components OC form a row of individual components along the axis x, perpendicular to the optical axis y. However, many other arrangements are possible and the invention is not limited to a particular arrangement of the optical components OC.

The substrate of the optical component assembly OCA can be any usual substrate enabling fabrication of optical components OC, e.g. glass, silicon, etc.

A first alignment structure is provided to the substrate. This first alignment structure comprises a cavity SC. This cavity can be formed using photolithography and etching, or any other techniques allowing high precision.

This cavity is designed according to the position of the optical components OC within the optical component assembly OCA. More precisely, its depth can substantially correspond to a line passing through the center positions of the optical components OC. A small offset can, however, exist between these centers and the etching line (corresponding to the depth), because the etching line corresponds to the bottom of the waveguide core.

The optical component assembly OCA has a front face OCF on which are positioned the optical components OC, and a back face not shown in FIG. 1.

Figure 2:
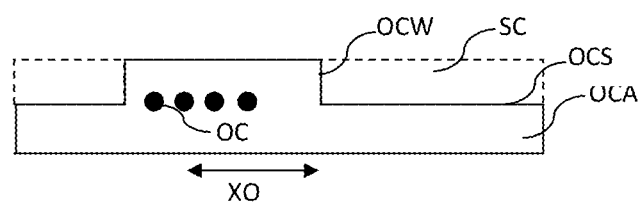
FIG. 2 depicts a front view of this optical component assembly.

FIG. 2 is a front view of this optical component assembly OCA, i.e., showing the assembly's front face OCF. The cavity SC has been depicted with dotted lines. In this example, it is made of two parts, in both sides of the optical components OC. This arrangement is optional but allows more stability of the optical component assembly OCA when positioned on the adapter as it will be shown later.

This cavity forms a step-like shape on the optical component assembly OCA which comprises a sidewall OCW and a bottom surface OCS. This bottom surface OCS of the cavity SC is at a depth corresponding both to the height of the sidewall OCW and substantially to the position of the centers of the optical components OC (taking into account the offset as explained earlier). Likewise, the position of the sidewall OCW along the transversal x axis is defined by a dimension XO, to which corresponds, as it will be later described, another dimension of the mating adapter ADP.

Figure 3:
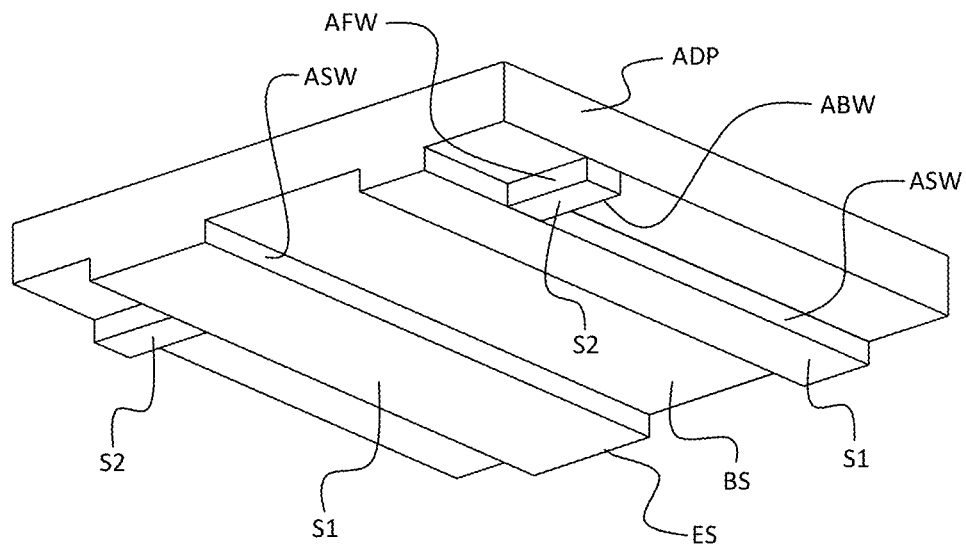
FIG. 3 depicts a mechanical adapter according to an embodiment of the invention.

FIG. 3 depicts a mechanical adapter ADP. Its shape is adapted to enable high-precision alignment between the optical component assembly OCA and a waveguide assembly. For this purpose, it includes two step structures S1, S2. These structures can be fabricated by one-step etching of the substrate until reaching a base surface BS, or, on the contrary deposition of a layer on the base surface BS. The structures constitute a relief along the elevation axis z, so as to form an elevated surface ES.

The height of the step structures S1, S2 corresponds to the depth of the base surface BS from the elevated surface ES. Its value is not relevant as long as it is superior to the heights of the alignment structures of the optical component assembly OCA (i.e. the depth of the cavity SC) and of the waveguides assembly. A first step structure is designed along the optical axis y of the adapter ADP. It means that it has front and back faces corresponding to the ones of the adapter ADP itself and sidewalls ASW parallel to this optical axis y, and preferably also to the elevation axis z.

In the example implementation depicted on FIG. 3 the first step structure is made of two parallel substructures, each of them having two sidewalls ASW on both sides. Other embodiments are also possible. For instance, the first step structure can be made of a plurality of smaller elevated structures, so that the sidewalls can be discontinuous walls. This embodiment may be beneficial to minimize the possible influence of defects at the sidewalls ASW.

In addition, the adapter ADP may comprise a second step structure S2, having a front wall (or face) AFW and a back wall (or face) ABW perpendicular to the optical axis y, and preferably also to the elevation axis z. This second step structure S2 can be optional as other embodiments are also possible. For instance, the back side of the optical component array substrate can be brought into contact with the waveguide facet. Since the tolerance to misalignment is quite high in this axis (in comparison to other axis), variations of the substrate thickness are acceptable up to a certain level (~5-10 microns (μm)).

This second step structure S2 can also be made of two separate substructure in both sides of the adapter ADP, like in the example implementation depicted in FIG. 3. The position of the second step structure along the optical axis y is not important.

Figure 4:
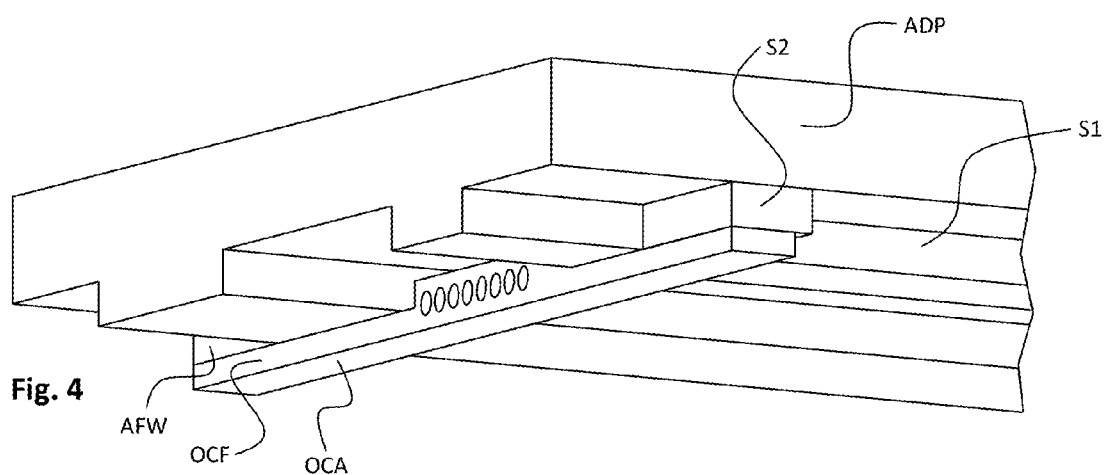
FIG. 4 depicts an embodiment where an optical component assembly is positioned on an adapter.

FIG. 4 shows how the optical component assembly OCA can be positioned on the adapter ADP. The bottom surface OCS of the cavity SC of the adapter ADP is put in contact with the surface of the step structures S1, S2. Preferably, both step structures have the same height. In case they have different heights, the bottom surface OCS is put in contact with the surface of the step structure which has the largest height. This contact ensures good positioning of the optical components OC according to the elevation z axis. In addition, the front face OCF of the optical component assembly OCA is precisely aligned with the front wall AFW of the second structure S2 of the adapter ADP. This ensures the right alignment of the optical components OC according to the optical axis y.

Figure 5:
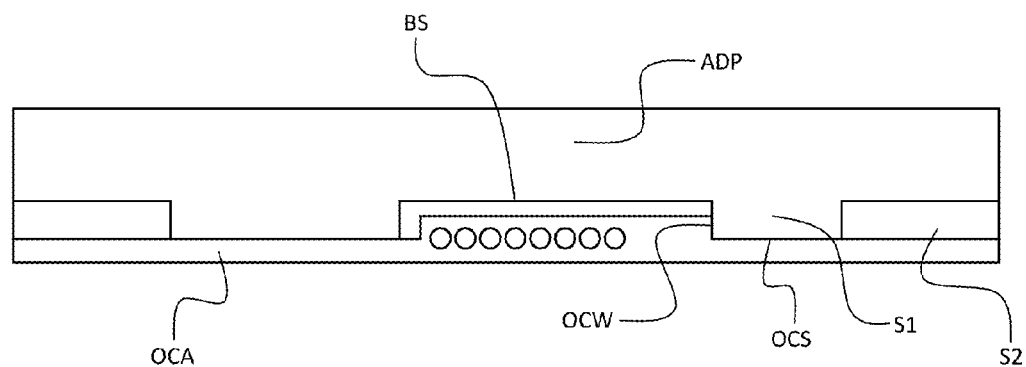
FIG. 5 depicts a front view of this same embodiment.

FIG. 5 shows the optical component assembly OCA and the adapter ADP from a front view. It shows again that the surface of the first step structure S1 is put in contact with the bottom surface OCS of the cavity of the optical component assembly OCA, so that to block the position of the optical component assembly OCA along the elevation z axis. It further shows that the depth of the cavity is not relevant as long as it is inferior to the height of the step structures S1, S2. Furthermore, the sidewall OCW is put in contact with the interior sidewall ASW of the first step structure S1. This contact ensures the position of the optical components OC along the x axis. As a result of the particular geometrical arrangements of both the adapter ADP and the optical component assembly OCA, the latter is constrained in all degrees of freedom.

Figure 6:
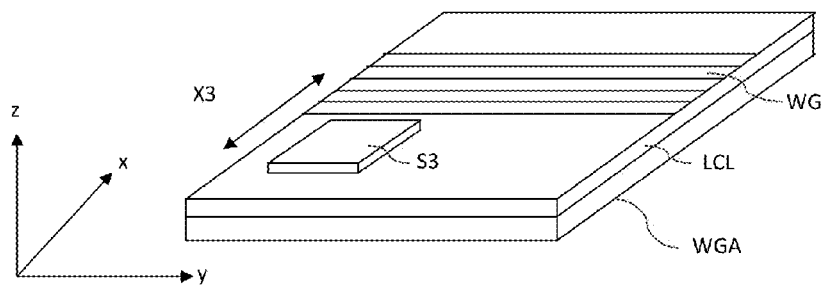
FIGS. 6 and 7 depict steps of a fabrication process of a waveguides assembly according to an embodiment of the invention.
Figure 7:
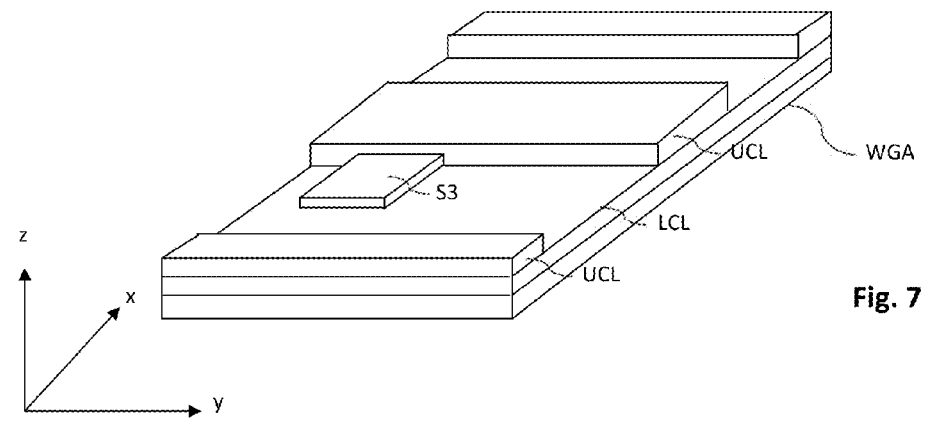

FIGS. 6 and 7 depict the fabrication process of a waveguide assembly WGA according to the invention. The assembly includes a lower cladding layer LCL. This layer is necessary to avoid light transmitted in the waveguides WG to be dispersed. It reflects light back to their cores by using low refractive index. It also includes a top cladding layer UCL for the same purpose. This top cladding layer covers the waveguides WG so as to reach its aim of focusing the light into the cores of the waveguides but it is also designed to form an alignment structure. The alignment structure resides in an accessible surface of the lower cladding layer LCL and a distinct step structure S3 (here below, referred to as third step structure).

The accessible surface is designed so as to allow contact with the surface of the first step structure of the adapter ADP. In other words, its width (i.e., along the x axis) should be at least equal to the width of the first step structure S1 of the adapter. Its length, along the optical axis y, allows sliding the first step structure S1 on the accessible surface. In the example of FIGS. 6 and 7, the accessible surface covers two large rows parallel to the waveguides WG and at both sides of them.

The third step structure S3 is designed according to the position of the waveguides WG within the waveguides assembly WGA. More specifically, its extreme position along the x axis is determined according to this position of the waveguide, i.e., the dimension X3 should be precisely defined at fabrication phase. The starting point of this dimension is a reference point of the waveguides WG.

However, the width is not important. The width is meant as the apparent width along the axis x. In the process depicted in FIGS. 6 and 7, the step structure is first fabricated, and then the top cladding layer UCL is deposited so as to partly cover the third step structure S3. However alternatives exist where the third step structure is fabricated at a position where it is not covered by the top cladding layer UCL.

Figures 8A, 8B, 8C:
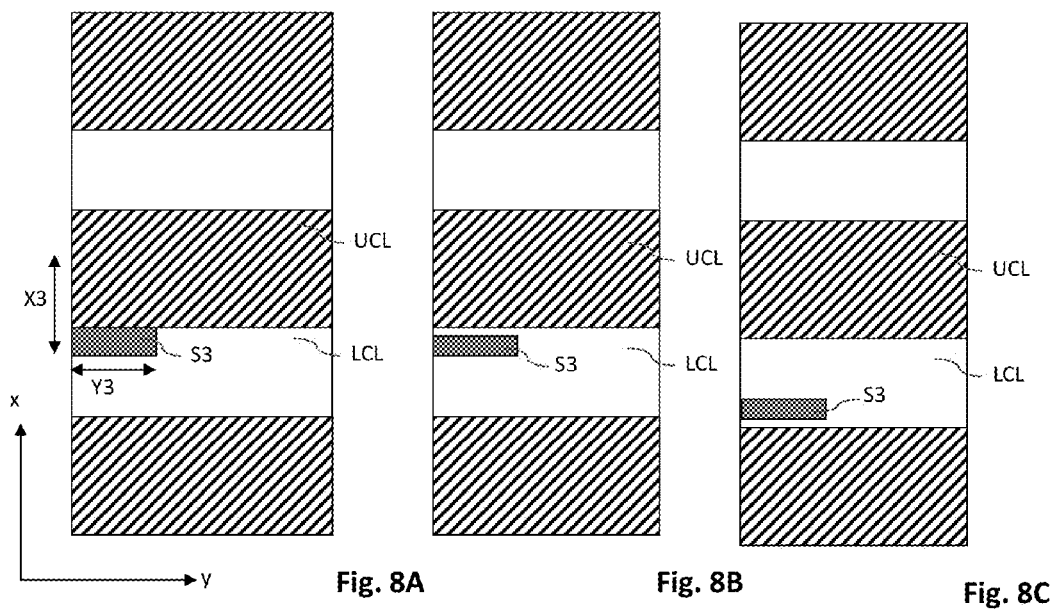
FIGS. 8A, 8B and 8C depict top views of three possible embodiments of a waveguides assembly.

FIGS. 8A and 8B show two possible embodiments of a waveguide assembly WGA as seen from the top. FIG. 8A corresponds to the embodiment already depicted in FIG. 6, whereas FIG. 8B shows an alternative embodiment in which the step structure S3 is not covered by the top cladding layer UCL. Comparing the two figures makes it apparent that the width itself of the third step structure is irrelevant but that the position X3 of the extreme (external) sidewall of the step structure is important.

This dimension X3 can be determined according to the distance between a reference point of the optical components OC corresponding to the reference point of the waveguides WG to mate and the sidewall OCW of the cavity SC of the optical component assembly OCA. In other words, it should be equal to the dimension XO which has been previously defined.

FIG. 8C illustrates still another embodiment wherein the third step structure S3 is provided so that its internal wall is at a position X3' designed so as to correspond to the external sidewall ASW of the first step structure S1 of the adapter ADP opposite. In other words, this dimension X3' is equal to the dimension X3 plus the width (along x axis) of the first step structure S1.

The embodiments depicted on FIGS. 8A and 8B are however preferred because the alignment is independent of the width of the first alignment structure S1 and therefore avoids a source of inaccuracy. The waveguides WG can be fabricated using standard techniques, well known in the art. The waveguides WG and the alignment structure (i.e., the accessible surface of the lower cladding layer and third step structure S3) can be precisely positioned by using photolithography for instance. A coarse positioning is sufficient for the top cladding layer. Therefore, only minimal additional complexity is added to the usual waveguide fabrication process.

Figure 9:
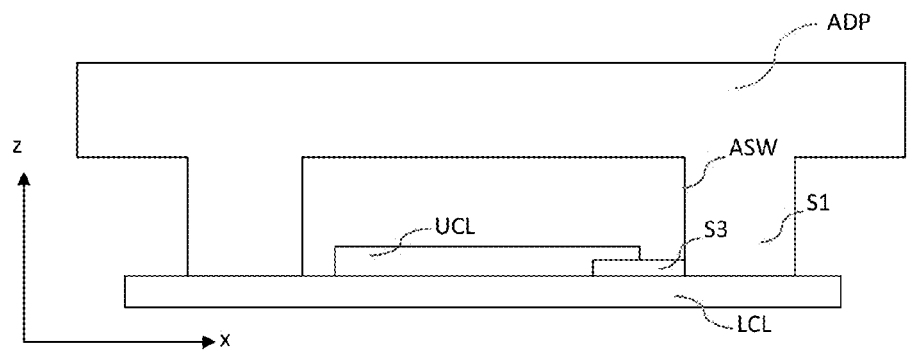
FIGS. 9 and 10 depict how the waveguides assembly can be positioned on the adapter according to an embodiment of the invention.
Figure 10:
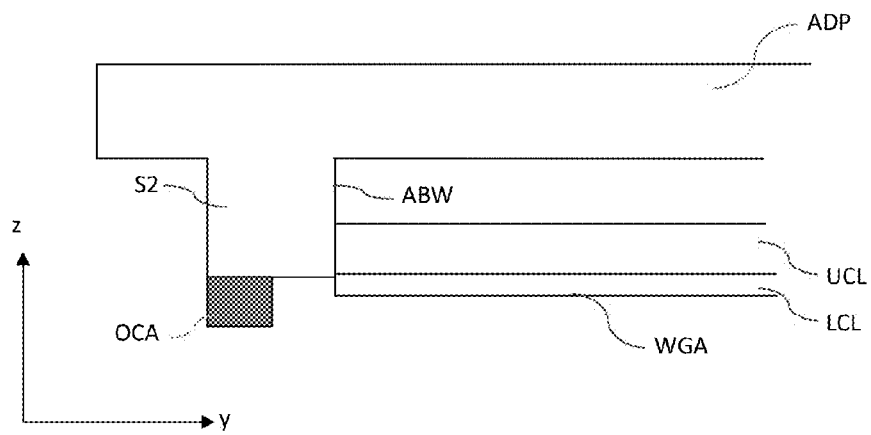

FIGS. 9 and 10 shows how the waveguide assembly WGA can be positioned with regard to the adapter ADP. As we will see, this positioning ensures a precise alignment with the optical component assembly OCA which has already been positioned. It should be here noted that the same adapter is used for the positioning of the optical components and waveguides assemblies. It should also be noted that they can be positioned on the adapter in any order. In the embodiment that has been described so far, the optical component assembly OCA is positioned before the waveguides assemble WGA, but it is possible to implement the alignment process the other way around.

FIG. 9 shows a front view, looking along the optical axis y. The waveguide assembly WGA is positioned so that the accessible surface of the lower cladding layer LCL is put in contact with the surface of the first step structure S1 of the adapter ADP. This ensures a good positioning of the waveguides WG with regard to the elevation axis z.

Furthermore, the third step structure S3 is put in contact with the sidewall ASW of the first step structure S1 of the adapter ADP. In the depicted embodiment, the third step structure S3 is put in contact with the internal side wall ASW of the step structure S1. This ensures a good positioning of the waveguide with regard to the x axis. The figure further shows that the height of the top cladding layer UCL is irrelevant as long as it is inferior to the height of the step structure S1.

FIG. 10 shows a side view. The waveguide assembly WGA is positioned so that its front face is put in contact with the back wall ABW of the second step structure S2 of the adapter ADP. More precisely, since the first step structure S1 is put in contact with the accessible surface of the lower cladding layer LCL, it is the upper cladding layer UCL that is in contact with its back wall ABW, and therefore enables the blocking and good positioning of the waveguides assembly AWG.

Referring once again to FIG. 4, the surface of the step structures S1, S2 corresponds to the bottom surface OCS of the cavity SC of the optical component assembly OCA. Also, this bottom surface is designed so that it corresponds substantially to a line going through the centers of the optical components OC (taking into account an offset, as explained earlier).

FIG. 10 shows that this same surface of the step structures S1, S2 corresponds also the interface line between the top and lower cladding layers UCL, LCL, where lies the waveguides WG. Therefore, thanks to the appropriate usage of the adapter ADP, the waveguides WG and the optical components OC are perfectly aligned according to the elevation z axis.

The optical components OC are in the front side of the optical component assembly OCA. Since this front side of the optical component assembly OCA is aligned with the front wall AFW of the second step structure S2, the distance between the optical components OC and the termination (input or output) of the waveguides WG is exactly the dimension the second step structure along the optical axis y.

This dimension is a design parameter, which can be optimized based on the free-space optics design. It can depend on the focal distance, the material of the lens substrate, waveguide dimensions, numerical aperture . . . . Multiple design sets with high coupling efficiency are possible. It can then be very precisely controlled during the fabrication process of the adapter ADP, e.g. by using an etching process.

Regarding the transversal x axis, it has been explained above that as a result of the third step structure S3, a reference point of the waveguides is precisely positioned with respect to the internal (for instance) side wall ASW of the first step structure S1 of the adapter ADP, and that the distance between this reference point and the internal side wall ASW equals a dimension X3.

It has also been explained that this dimension X3 matches the distance X0 between the sidewall OCW of the cavity SC of the optical component assembly OCA and another reference point of the waveguides WG. If these reference points are matching and the assemblies designed accordingly, the waveguides WG and the optical components OC will be perfectly aligned when mounted on the adapter ADP.

In order to achieve high-precision alignment between the optical components OC and the waveguides WG, it is important that the adapter ADP is very precisely designed, e.g. straight border lines. These conditions can be achieved by etching silicon surface to form the alignment structures.

The surface may be smooth, but for example the sub-micrometer scalloping caused by the well-known Bosch process does not have any significant influence on the alignment accuracy because approximately equal size of roughness is observed in the entire structure.

Figure 11:
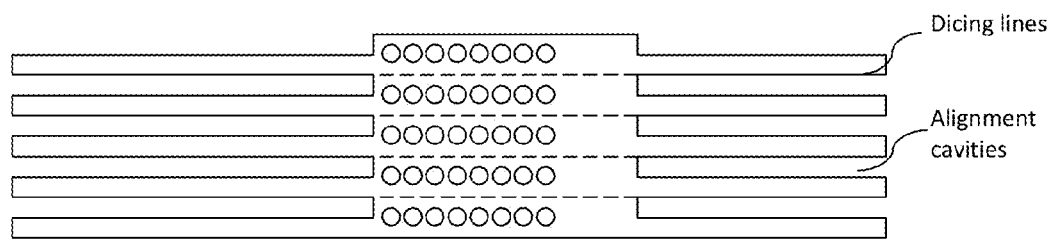
FIG. 11 depicts an embodiment for the fabrication process of optical component assemblies.

Both the optical component assembly OCA with its alignment structure and the adapter can be fabricated using standard processing techniques at wafer scale. FIG. 11 shows a view of multiple lens arrays before separation into individual elements by dicing.

Similarly, numerous adapters can be fabricated on a single wafer and diced into individual elements. The elements optical component assembly OCA, adapter ADP and the waveguide assembly WGA can be fixed to each other using an adhesive, such as an epoxy.

According to embodiments of the invention, the same reference planes of the adapter ADP are used for positioning the optical components OC and the waveguides WG (i.e. the sidewalls of the first step structure S1). This brings the highest possible positioning accuracy within the techniques based on adapters.

For example, as the optical component assembly OCA and the adapter ADP are aligned to the same reference planes of the adapter ADP, the alignment is not dependent on the thermal expansion and contraction and any size deviations of the adapter. In other words, the solution of the invention has the advantages of adapter-based solutions without their drawbacks, e.g. linked to the dependence on thermal conditions.

Furthermore, the alignment of the optical components OC and of the waveguides WG is provided by only a few elements and design parameters of the adapter ADP, as it has been explained earlier. By contrast, it is insensitive to the substrate thickness of any of the elements, the depth of the cavities in the optical components array and the adapter, the dicing position of the elements, and the thickness of the cladding layers in the waveguide stack.

This provides the solution with a good flexibility and contributes to reduce manufacturing complexity and cost. For instance, the insensitivity to several parameters (as listed above, for example) increases dramatically the process yield. Typical dicing saw blades can lead to position errors of ten of micrometers. Trying to achieve higher precision would increase the fabrication cost. Since diced boundaries of the optical component substrate and the adapter are not used for alignment according to any axis, this brings another advantage to the invention.

Furthermore, all alignment structures of the optical component assembly can be formed by processing on the same surface of the substrate of the optical components themselves. It reduces the number of operations to perform and therefore both the manufacturing cost and the risk of alignment imprecisions. Also, it should be noted that this technique is purely passive, and does not imply transmitting light inside the waveguides and optical components to measure losses. However, it achieves alignment precisions at least comparable with these active approaches.

The invention claimed is:

1. An apparatus for aligning optical components with optical waveguides according to a common optical axis, comprising:
   an optical component assembly comprising a substrate having the optical components disposed at a mid-portion of the substrate, and a first alignment structure associated with the substrate of the optical component assembly, the first alignment structure comprising a cavity formed at opposing sides of the mid-portion of the substrate, such that a depth of the cavity corresponds to a line passing through center positions of the optical components;

an adapter configured to have the optical component assembly positioned thereon, the adapter having a base surface comprising a first step structure disposed along a first axis and a second step structure disposed along a second axis perpendicular to the first axis, wherein a bottom surface of the cavity is in contact with the first and second step structures; and an optical waveguides assembly comprising the optical waveguides and a second alignment structure comprising a distinct step structure designed according to the position of the waveguides within the waveguides assembly;

wherein the optical component assembly, the optical waveguide assembly and the adapter are positioned so that a sidewall of the cavity and the distinct step structure are in contact with a sidewall of the first step structure.

2. The apparatus of claim 1, wherein the optical components comprise optical lenses.

3. The apparatus of claim 1, wherein the optical components comprise mirrors.

4. The apparatus of claim 1, wherein the part of the distinct step structure in contact with the sidewall of the first step structure is positioned at a distance of a first reference point associated with the waveguides equal to the distance between a second reference point associated with the optical components and the sidewall of the cavity.

5. The apparatus of claim 1, wherein the waveguides assembly comprises a top cladding layer covering the waveguides.

6. The apparatus of claim 1, wherein the top cladding layer covers partially the distinct step structure.

7. The apparatus of claim 1, wherein the first step structure is made of two parallel substructures, each of them having two sidewalls on both sides.

* * * * *